No. 650,320. Patented May 22, 1900.
W. HEPFINGER.
PUZZLE MAP.
(Application filed Mar. 13, 1900.)
(No Model.)
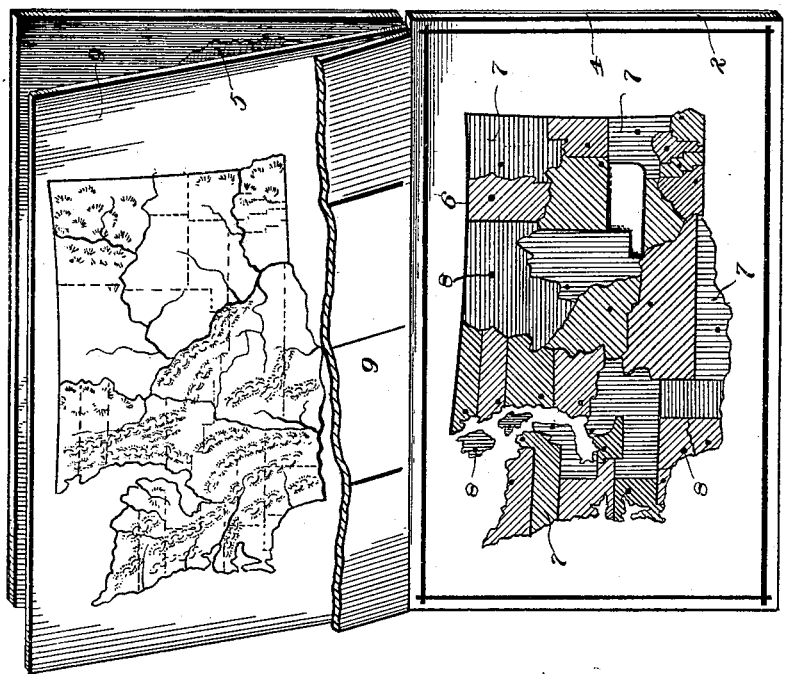
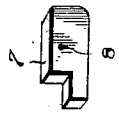
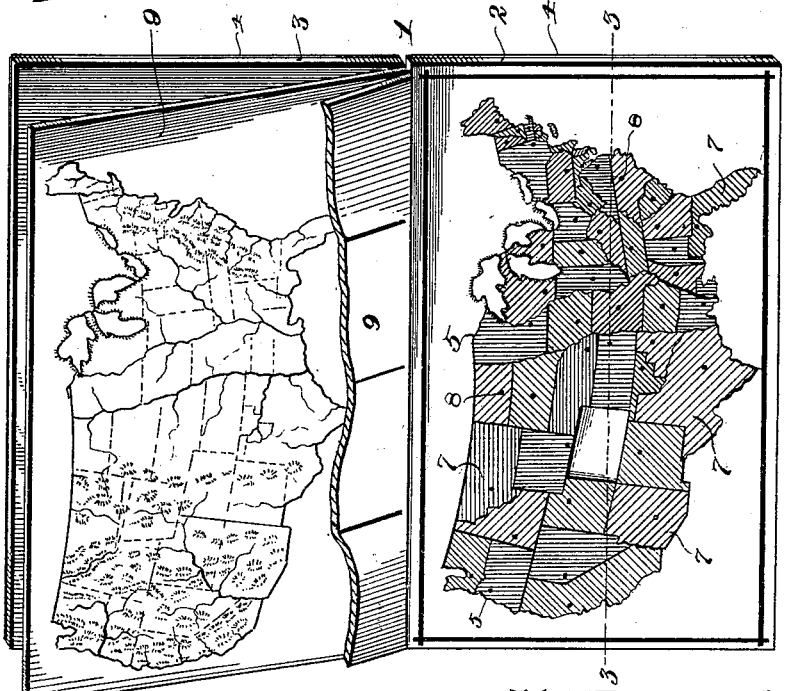

UNITED STATES PATENT OFFICE.

WILLIAM HEPFINGER, OF MONTESANO, WASHINGTON.

PUZZLE-MAP.

SPECIFICATION forming part of Letters Patent No. 650,320, dated May 22, 1900.

Application filed March 13, 1900. Serial No. 8,470. (No model.)

*To all whom it may concern:*

Be it known that I, WILLIAM HEPFINGER, a citizen of the United States, residing at Montesano, in the county of Chehalis and State of Washington, have invented a new and useful Puzzle-Map, of which the following is a specification.

This invention relates to a puzzle educational and advertising device; and the object of the same is to provide a simple and effective article of the character set forth wherein are embodied sectional maps composed of separable parts representing States, counties, or particular tracts which are adapted to be taken out from or replaced in their support and to be flush with the face side of the latter when disposed therein to thereby serve as instructive or educational means and also including leaves or movable devices between the two maps for holding the parts together in place while opening or closing the device and upon which suitable advertising matter or other information can be applied.

The invention particularly consists in the construction and arrangement of parts, which will be more fully hereinafter described and claimed.

In the drawings, Figure 1 is a perspective view of a puzzle educational and advertising device embodying the features of the invention and showing a map of the United States exposed and arranged in connection with one part thereof. Fig. 2 is a view similar to Fig. 1, exposing another portion of the improved device and showing a map of a State divided into counties, which are composed of separable parts. Fig. 3 is a section on the line 3 3, Fig. 1. Fig. 4 is a detail perspective view of one of the separable parts representing a State and shown removed from the map illustrated by Fig. 1. Fig. 5 is a perspective view of a separable part representing a county and removed from the map shown by Fig. 2.

Similar numerals of reference are employed to indicate corresponding parts in the several views.

The numeral 1 designates a book-like device comprising comparatively-heavy back members 2 and 3, which preferably have an outer ornamental or other covering material 4 adhesively applied thereto, or the exterior surfaces of the said back members may be made without the said coverings and ornamented by any suitable or preferred design, picture, or illuminated advertising matter. It is proposed to delineate on the inner faces of the back members 3 the maps of the United States, individual States, tracts, counties, or other divisions and to separate the several States, counties, or sections in the form of removable parts and have the backs 3 cut out to accurately receive the same. It is also intended that these maps be fully illuminated or different parts colored to represent varying characteristics of the different soils or to indicate mineral lands, climatic conditions, or any other special features that may be desired, and, moreover, to accurately indicate the rivers, mountains, lakes, latitude and longitude, the capital cities and county seats, railroads, and general characteristics as to production and population, and thereby provide means for educating those working the puzzle at the same time that the attention of the solver may be engrossed in properly arranging the several separate parts.

In the accompanying drawings a map 5 of the United States is represented in connection with one back 3, and in the other back 3 a map 6 of the State of Washington is located. The map 5 is composed of separable parts 7, representing the several States and Territories of the United States, and in contour the several parts accurately correspond to the boundaries of the several States and Territories and, as shown, have openings 8, one in each, representing the location of the capital city and which may be replaced by prominent dots or other marks. When all the parts 7 are disposed in the back 3, they are flush with the inner face of the latter, as shown by Fig. 3. In like manner the map 6 is composed of a series of separable parts 7, which represent counties of the State of Washington, and these in like manner have dots or openings 8 to designate the location of the county seats. In addition to these two maps or any others that may be employed will be supplied or provided with other interesting educational matter, and between the two backs 3 and movably connected thereto are intermediate leaves or partition devices 9, which may be divided, as shown, to serve as receptive means for advertising matter or printed directions or explanations referring generally to the maps included or to some particular tract in a county of a State that may be individually represented on a large scale. These leaves or partitions 9 also have the more important function of providing keys for use in connection with the maps located on the inner faces of the back members 3. On the inner face of each partition 9 a map is illustrated which corresponds in each instance to the map on the inner face of the back or cover. The inner face of the leaf or partition 9 nearest the back of the cover having the map of the United States therein carries a duplicate representation of the map applied to the inner face of the opposite back or cover and can be read downwardly in the direction of the latter—that is, both maps are headed in the same direction—and the map on the leaf 9 will thus be used as a key for arranging and reading the map corresponding thereto on the back or cover and will be supplied with names of waterways, rivers, and the like, as well as counties, towns, cities, and other useful matter, and the whole device, which is in the form of a book, can be conveniently held for reference in pursuing the solution of the puzzle or so that both the map on the leaf or partition 9 and on the back or cover corresponding thereto may be viewed together, and this will be accomplished by holding the other leaf or partition away therefrom. The map of the States on the other cover or back is likewise supplied with a key located in reverse position to that just described and bearing similar information or instructions as to solution. In addition to this important function and particular arrangement set forth the partition-leaves 9 will also serve as a means for holding the separable parts of the puzzle-maps in the backs or covers in place and prevent them from dropping out of position. In solving the puzzle it is proposed to keep the key-map in each instance on the partition-leaves 9 covered or concealed until the solver has arranged the separable parts of the maps or map and then refer to the key to determine the accuracy of the solution, and thus have the device serve in an educational manner with apparent efficiency.

The invention is subject to a wide range of modifications, and it will be understood that changes in the form, proportions, size, and minor details may be resorted to without in the least departing from the principles or scope of the invention.

Having thus described the invention, what is claimed as new is—

1. A combined puzzle educational and advertising device comprising backs having maps delineated on the inner surfaces thereof, and composed of removable separable parts representing defined sections and fitting flush with the inner faces of said backs when applied, and leaves between the backs to bear against the parts of the maps to hold the parts of one while the other is in use.

2. A puzzle educational and advertising device having backs or covers and movable partition-leaves between the same, the inner faces or sides of the backs or covers having puzzle-maps located therein and composed of separable parts, and the inner opposing faces or sides of the partition-leaves provided with keys in the form of maps and instructive matter corresponding to the maps on the inner sides of the backs or covers and in a position to be read relatively to the latter, the said key-maps and instructive matter being concealed while working the puzzle-maps on the inner sides of the backs or covers.

In testimony that I claim the foregoing as my own I have hereto affixed my signature in the presence of two witnesses.

WILLIAM HEPFINGER.

Witnesses:
   B. F. HUFF,
   SETH WARREN.